Jan. 23, 1940.   G. J. LANZ   2,187,789
FLUID PRESSURE BRAKE SYSTEM
Filed March 26, 1938
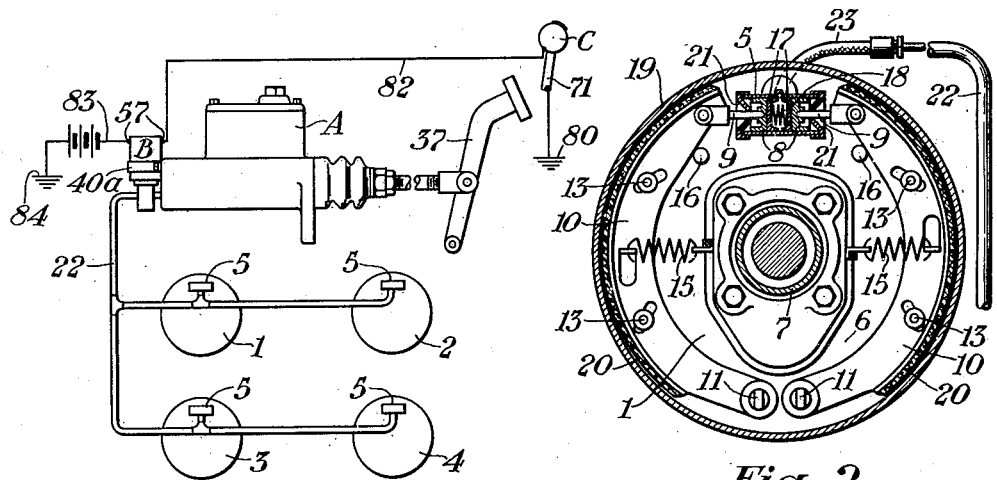
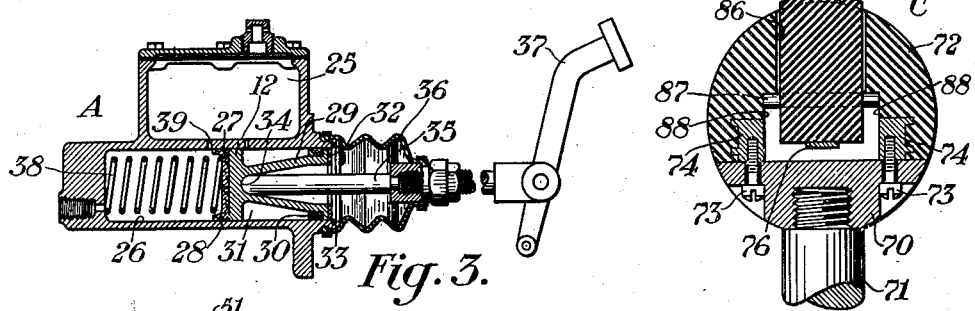
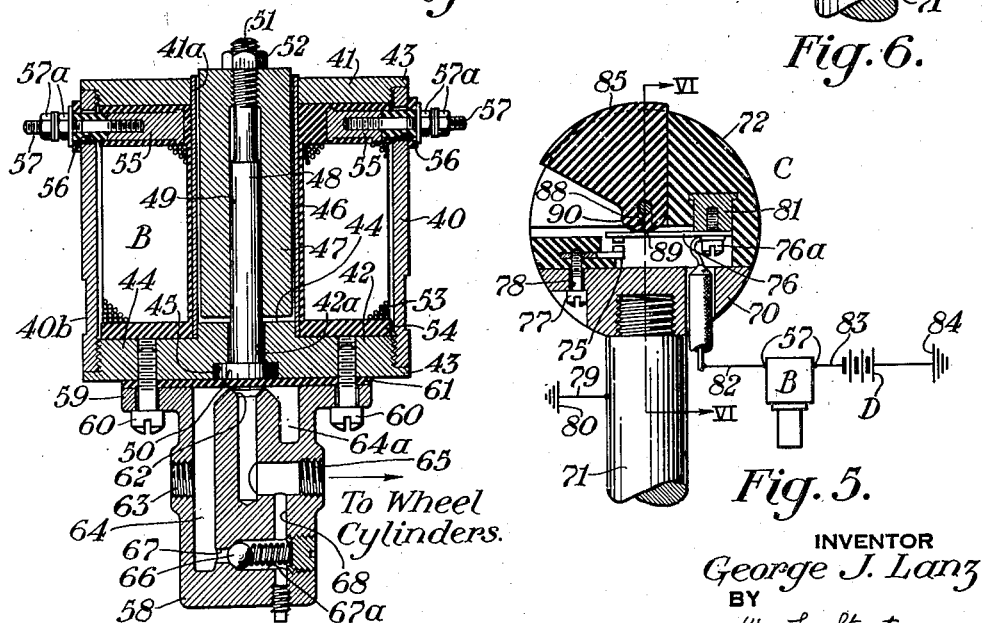
INVENTOR
George J. Lanz.
BY
W. L. Stout
his ATTORNEY Patented Jan. 23, 1940

2,187,789

UNITED STATES PATENT OFFICE 2,187,789

FLUID PRESSURE BRAKE SYSTEM

George J. Lanz, Wilkinsburg, Pa.

Application March 26, 1938, Serial No. 198,291

11 Claims. (Cl. 188—265)

My invention relates to fluid pressure brake systems, and particularly to fluid pressure brake systems of the type commonly employed on automotive vehicles.

One object of my invention is to provide a simple, reliable and effective means whereby the operator of a vehicle may, when desired, maintain the brakes in their applied positions following a brake application without the necessity for maintaining his foot on the brake pedal.

Another object of my invention is to provide an electrically controlled valve mechanism which can be inserted in a brake system of the type described at any suitable location between the source of fluid pressure and one or more of the wheel cylinders, and which is effective when operated to retain the fluid in such cylinder or cylinders at any pressure to which it has been raised by an application of the brakes.

A further object of my invention is to provide switch means which can be secured to the gear shift lever of an automotive vehicle in place of the usual knob, and which is so constructed that it can be readily operated, to effect the control of the above mentioned valve mechanism, by the same hand with which the operator shifts gears without removing his hand from the gear shift lever or interfering with the shifting of the gears.

Further objects and characteristic features of my invention will appear as the description proceeds.

I shall describe one form of fluid pressure brake system embodying my invention, and shall then point out the novel features thereof in claims.

In the accompanying drawing, Fig. 1 is a schematic view illustrating one form of brake system embodying my invention. Fig. 2 is an enlarged sectional view of the brake unit 1 indicated diagrammatically in Fig. 1. Fig. 3 is an enlarged vertical sectional view of the combined reservoir and master cylinder unit A shown in Fig. 1. Fig. 4 is an enlarged vertical sectional view of the magnet valve B shown in Fig. 1. Fig. 5 is an enlarged vertical sectional view of the switch C shown in Fig. 1. Fig. 6 is a sectional view taken on the line VI—VI of Fig. 5.

Similar reference characters refer to similar parts in each of the several views.

A brake system embodying my invention comprises, in general, any suitable means for supplying fluid pressure to one or more fluid pressure operated brake units, a magnet valve effective when energized for maintaining the fluid in such brake unit or units, as the case may be, following an application of the brakes to maintain the brakes in their applied positions, and switch means for controlling the energization of the magnet valve. In the particular embodiment of my invention illustrated in the drawing, the brake system is of the hydraulic type commonly employed on automobiles, and includes four brake units 1, 2, 3 and 4, one of which will usually be located at each wheel of the automobile, although it is obvious that these units may be associated with the propeller shaft, or may be placed at any other suitable location or locations. The units 1, 2, 3 and 4 may have any usual construction, and as here shown, are each similar to the unit 1 illustrated in detail in Fig. 2. Referring to Fig. 2, this unit comprises a wheel cylinder 5 mounted on a backing plate 6 attached to the axle or differential housing 7. The cylinder 5 includes opposed pistons 8, each of which is connected by a link 9 with a brake shoe 10 pivoted at 11 to the backing plate 6. Guide means 13 are provided for the brake shoes 10, as are also the retracting springs 15 which normally hold the brake shoes 10 against suitable stops 16. Associated with the pistons 8 are flexible rubber cups 17 which are held against the faces of the pistons by an interposed spring 18. The inner ends of the links 9 rest in sockets in the rear sides of the pistons 8, and when the stops 16 are adjusted to position the shoes closer to the drum 19 to compensate for wear on the linings 20, the inner ends of the links 9 move outwardly in their sockets without disturbing the pistons 8. This arrangement is desirable as an outward pull on the pistons might tend to draw air past the pistons and into the wheel cylinders. Flexible caps 21 of rubber or other suitable material connect the ends of the wheel cylinder 5 with the links 9, and serve to exclude dirt and moisture from the wheel cylinder 5. Fluid is supplied to the wheel cylinder through a pipe or conduit 22, and in order to prevent breakage of this conduit due to the necessary movement of the wheels relative to the vehicle frame, the conduit is provided adjacent the point where it is connected to the wheel cylinder with a flexible portion 23. It will be apparent that when fluid is supplied to the wheel cylinder 5, the pistons 8 will move outwardly in the cylinder and will act through the associated links 9 to rotate the brake shoes 10 about their pivots 11 to the positions in which they frictionally engage the brake drum, thereby effecting an application of the brake.

The means shown in the drawing for supplying fluid to the wheel cylinders to effect an application of the brakes comprises a combined reservoir and master cylinder unit A (see Fig. 3) consisting of a suitable casing containing a reservoir 25 and a master cylinder 26. The master cylinder 26 has a piston 12 reciprocally mounted therein. The piston comprises a face portion 27 adapted to carry a packing cup 28, and a rearwardly extending flange 29 spaced from the cylinder wall. The end of the rearwardly extending flange 29 has a radial flange 30 which contacts with the cylinder wall to guide the piston in the cylinder, forming an annular recess 31 around the piston. A ring 32 is retained in the end of the cylinder by a split ring 33, and is adapted to limit the movement of the piston toward the rear end of the cylinder. The piston is also provided with a socket 34 which engages the rounded inner end of a push rod 35 by means of which the piston may be moved. The push rod extends outside of the cylinder through a flexible boot 36, and is adjustably connected at its outer end with a suitable operating lever which is here shown as the usual foot pedal 37, but which may, if desired, be operated by hand or by suitable power means. A compressed coil spring 38 is interposed between the packing cup 28 and the outlet end of the master cylinder and serves to return the piston to the retracted position shown when the foot pedal is free to move to its released position. The master cylinder 26 is adapted to communicate with the reservoir 25 through the restricted port 39 when the cylinder occupies its retracted position. The discharge end of the cylinder is connected with the conduit 22 leading to the wheel cylinder as will readily be seen from an inspection of Fig. 1.

The magnet valve is designated as a whole by the reference character B and in the preferred form illustrated in Fig. 4, is of the solenoid actuated rubber diaphragm type. Referring to Fig. 4, this valve as here shown comprises a shell made up of a metal tube 40 of suitable magnetizable material, preferably wrought iron, internally threaded at its opposite ends to receive two magnetizable end members 41 and 42 which are also preferably of wrought iron, and which are screwed into the tube to the positions in which flanges 43 formed on these members engage the ends of the tube. The lower end member 42 is provided with an axial hole 42a, the upper end of which is surrounded by an annular boss 44, and the lower end of which communicates with an annular recess 45. The upper end member 41 is likewise provided with an axial hole 41a which is somewhat larger in diameter than the hole 42a, and extending into the shell through the hole 41a is a bushing 46 of suitable non-magnetic material such as brass, the lower end of which engages the boss 44. A plunger 47 of suitable magnetizable material such as wrought iron is slidably mounted in the bushing 46, and is secured to a valve stem 48 which extends downwardly through a hole 49 formed in the plunger, and through the hole 42a in the end member 42, and is provided at its lower end with an enlarged head 50 which fits into the recess 45 with some clearance. For reasons which will appear hereinafter it is desirable to be able to adjust the stroke of the plunger, and to this end the upper end of the valve stem is screw-threaded, and the upper end of the hole 49 in the plunger is tapped in the manner shown. Furthermore, the upper end of the valve stem is provided with a saw kerf 51 for the reception of a screw driver or like tool to enable the valve stem to be readily rotated relative to the plunger, and with a jam nut 52 to lock the valve stem in its adjusted position. Surrounding the bushing 46 is a winding 53 wound on an insulating spool 54, the upper head of which is provided at its opposite sides with threaded metal inserts 55 which are connected with the opposite ends of the winding. The inserts 55 align with holes 56 formed in the tube 40 through which terminal posts 57, which are screwed at their inner ends into the inserts, extend. The terminal posts are suitably insulated from the tube, and are provided with nuts 57a for securing circuit wires to the terminal posts.

The valve portion of the magnet valve comprises a casing 58 preferably of brass or bronze provided at its upper end with an annular flange 59 which is securely clamped against the lower end member 42 by means of screws 60 distributed at spaced points around the flange. A flexible diaphragm 61, preferably rubber, is interposed between the flange and the end member 42, and this diaphragm cooperates with the enlarged head 50 of the valve stem 48 and with an annular valve seat 62 formed in the casing directly below the head 50, in such manner that when the winding 53 is deenergized fluid is free to flow from a threaded opening 63 formed in one side of the casing through a passageway 64 and chamber 64a which surrounds the valve seat, into a threaded opening 65 formed in the other side of the casing directly opposite the opening 63, or vice versa, but that, when the winding 53 is energized the diaphragm 61 will be pressed into engagement with the valve seat 62 by the head 50 of the valve stem, and will cut off communication between the openings 63 and 65 through the passageway 64 and chamber 64a. The valve portion of the magnet valve also includes a spring pressed check valve 66 which permits fluid to flow from the opening 63 to the opening 65 through passageways 67, 67a and 68 but which effectively prevents the flow of fluid from the opening 65 to the opening 63 through these last mentioned passageways. It will be seen, therefore, that when the magnet valve is energized, fluid can always flow through the valve from the opening 63 to the opening 65, but is effectively prevented from flowing in the opposite direction.

The magnet valve B may be inserted into the brake system at any desired location between the master cylinder and as many of the brake units as it is desired to retain in their braking positions by the magnet valve following a brake application. As shown in the drawing, the valve is inserted into the conduit 22 adjacent the master cylinder 26 in such manner that if the magnet valve is energized when the brakes are applied, the valve will trap fluid in the wheel cylinders 5 of all four brake units, and it will be apparent, therefore, that by energizing the magnet valve prior to making a brake application, or while the brakes are in their applied positions, all four brake units may be maintained in their braking positions as long as the magnet valve subsequently remains energized, even though the operator removes his foot from the foot pedal 37.

When the magnet valve is disposed in the position shown it may conveniently be secured to the brake cylinder casing by a suitable strap 40a which fits into an annular groove 40b formed in the outer face of the tube 40, and which is bolted at its ends to the brake cylinder casing.

The switch means C for controlling the energization of the magnet valve is preferably so constructed that it can be secured to the gear shift lever in place of the usual knob, and in the form shown in Figs. 5 and 6 comprises a metal base portion 70 which is screwed onto the top of the usual gear shift lever 71, and a moulded insulating head 72 which is secured to the metal base portion 70 by means of screws 73 which pass through clearance holes in the base portion and are screwed into threaded inserts 74 moulded into the head. Also moulded into the head is a fixed contact member 75 which cooperates with a flexible contact finger 76 to form a contact 75—76. The member 75 is threaded to receive a screw 77 which passes upwardly through a hole 78 in the base portion 70, whereby the member 75 may be electrically connected with the gear shift lever, and hence with the frame of the vehicle as indicated by the wire 79 and conventional ground symbol 80. The flexible contact finger 76 is secured at one end to the head by means of a screw 76a which passes through the finger, and is screwed into a threaded insert 81 moulded into the head. The screw 76a also serves to secure a conductor 82 to the finger, which conductor, in turn, is connected to the one terminal post 57 of the magnet valve B in the manner shown in Figs. 1 and 5. The other terminal post 57 is connected by means of a conductor 83 to one terminal of the usual car battery D, the other terminal of which is grounded to the car frame, as indicated by the conventional ground symbol 84. In actual practice, the last mentioned terminal 57 will usually be connected with the battery D through the ignition switch in such manner that the terminal will only be connected to the battery when the ignition switch is on. It will be seen, therefore, that when the contact 75—76 is closed the magnet valve will become energized. The contact 75—76 is arranged to be closed by an operating member 85 of suitable moulded insulating material. The member 85 projects out through a slot 86 formed in the top of the head 72, and is provided at its lower end with a cross pin 87 which is slidably and rotatably mounted in vertical guide slots 88 formed in the head 72 on opposite sides of the slot 86. The lower end of the member 85 is also provided with a flat portion 89 which normally rests on top of the finger 76, and with a rounded cam surface 90. The parts are so proportioned that when the operating member is released, the inherent resiliency of the finger 76 will hold the operating member in the position shown and in which the contact 75—76 is open, but that, the contact can be closed either by depressing the operating member, or by rotating it downwardly through a slight angle, in which latter case the cam surface 90 will cooperate with the finger 76 in such manner that the contact will remain closed even though the operator releases the operating member. After the contact has been closed by rotating the operating member downwardly, it can be subsequently opened by restoring the operating member to the position shown.

With the brake system constructed in the manner described it will be obvious that when the contact 75—76 is open so that the magnet valve B is deenergized, the brakes will operate in response to the operation of the foot pedal 37 in the conventional manner. If, however, the operator wishes to retain the brakes in their operated position without the necessity for retaining his foot on the brake pedal, as where he is compelled to stop on a grade to wait for a traffic light, or to start on a grade or is descending a long grade, he may do so by merely operating the operating member 85 to close the contact 75—76 either before he has applied the brakes, or while they are still in their applied positions. The closing of the contact 75—76 will, as was previously pointed out, cause the magnet valve B to become energized and trap the fluid in the wheel cylinders 5 at the highest pressure to which it is raised while the magnet valve is energized, thus permitting the operator to remove his foot from the foot pedal, and hence permitting him to obtain better control of his car. If the operator only wishes to maintain the brakes in their braking position momentarily he will usually operate the contact by depressing the operating member 85 with the thumb or other part of the hand with which he operates the gear shift lever, but if he wishes to maintain the brakes in their applied position for any appreciable period of time, or without the necessity for maintaining his hand on the gear shift lever, he will usually operate the contact by rotating the operating member 85 to its lowermost position to thus lock the contact 75—76 in its closed position. When he desires to subsequently release the brakes he will restore the member 85, or permit it to move due to the bias of the finger 76, to the position shown.

It should be pointed out that due to the fact that the area around the valve seat 62 is larger than the area within the valve seat 62 the pressure tending to unseat the diaphragm 61 due to fluid flowing toward the wheel cylinders is greater than that tending to unseat the valve due to fluid flowing in the opposite direction, and that, as a result, by properly proportioning the parts, the valve may be so constructed that it will permit fluid to flow to the wheel cylinders even though the magnet valve is energized, but will not permit it to flow in the opposite direction when the magnet valve is energized, without the necessity for the check valve 66. This latter construction increases the simplicity of the system and tends to decrease its cost, as well as to eliminate a possible source of fluid leakage.

I have found that with a brake system embodying my invention a magnet valve of relatively small size requiring an energizing current of not more than 5 amperes at the battery voltage usually provided on automobiles can be successfully used to maintain the pressure in the wheel cylinders at a sufficiently high value to hold an automobile for long periods of time on the steepest grades on which it would ever be used.

One advantage of a brake system embodying my invention is that it can be applied to any form of automobile which is provided with fluid pressure brakes regardless of whether the brakes are of the hydraulic, air pressure, or vacuum type.

Another advantage of a brake system embodying my invention is that there is a minimum number of parts to wear, which materially adds to the reliability and practicability of the system.

A further advantage of a system embodying my invention is that it is universal in its application to automobiles having fluid pressure brakes, and readily lends itself to use on such vehicles.

Although I have herein shown and described only one form of brake system embodying my invention, it is to be understood that various changes and modifications may be made therein within the scope of the appended claims without departing from the spirit and scope of my invention.

Having thus described my invention, what I claim is:

1. In a hydraulic brake system for automobiles, the combination with a wheel cylinder and a master cylinder connected by a fluid conduit, a valve in said conduit for controlling the flow of fluid through said conduit comprising a valve seat and a rubber diaphragm cooperating with said seat, and a solenoid operated valve stem cooperating with said diaphragm to force said diaphragm into engagement with said seat to close said valve.

2. In a hydraulic brake system for automobiles, the combination with a fluid pressure responsive brake unit and means connected with said unit for supplying fluid pressure to said unit, of a valve interposed between said unit and said means, said valve comprising an annular valve seat, a rubber diaphragm disposed above said seat, and a solenoid actuated valve stem disposed above said diaphragm and effective when said solenoid is operated to force said diaphragm into engagement with said seat, the parts being so arranged and so proportioned that when said diaphragm is engaging said seat a larger area of said diaphragm will be subjected to the pressure of the fluid tending to flow toward said unit than is subjected to the pressure of the fluid tending to flow in the opposite direction, whereby if said solenoid is energized when said means is operated said valve will be forced open to permit the fluid to flow to said unit but will be effective to prevent fluid from escaping from said unit as long as said solenoid remains energized.

3. In a fluid operated brake system for vehicles, the combination with a fluid responsive brake applying means and a conduit through which fluid is at times supplied to said means to cause a brake application, of a valve in said conduit comprising a valve seat, a flexible member effective when pressed against said seat to prevent the flow of fluid through said conduit in the direction to release said brake applying means, and a magnetically operated valve stem cooperating with said member to press said member against said seat.

4. In a fluid operated brake system for vehicles, the combination with a fluid responsive brake applying means and a conduit through which fluid is at times supplied to said means to cause a brake application, of a valve in said conduit for controlling the flow of fluid through said conduit, said valve comprising a valve seat, a diaphragm disposed above said seat, and a magnetically operated valve stem disposed above said diaphragm and effective when operated to force said diaphragm into engagement with said seat, said diaphragm being of a material which is sufficiently yieldable to permit the necessary movement thereof and to provide a good seal when pressed against said seat.

5. In a fluid operated brake system for vehicles, the combination with a fluid responsive brake applying means and a conduit through which fluid is at times supplied to said means to cause a brake application, of a valve in said conduit for controlling the flow of fluid through said conduit, said valve comprising a valve seat, a diaphragm disposed above said seat, a magnetically operated valve stem disposed above said diaphragm and effective when operated to force said diaphragm into engagement with said seat, said diaphragm being of a material which is sufficiently yieldable to permit the necessary movement thereof and to provide a good seal when pressed against said seat, and means for varying the stroke of said valve stem to enable the pressure with which said valve stem forces said diaphragm into engagement with said seat to be varied.

6. In a fluid operated brake system for vehicles, the combination with a fluid responsive brake unit and means connected with said unit for supplying fluid to said unit, of a valve interposed between said unit and said means, said valve comprising a valve seat, a diaphragm cooperating therewith, and a solenoid operated valve stem effective when said solenoid is energized to force said diaphragm into engagement with said seat, said diaphragm being of a material which is sufficiently yieldable to provide a good seal when pressed against said seat, and the parts being so proportioned that when said solenoid is energized a larger area of said diaphragm will be subjected to the pressure of the fluid flowing in a direction to operate said unit than is subjected to the pressure of the fluid flowing in the opposite direction, whereby if said solenoid is energized when said means is operated said valve will open to permit operation of the unit but will be effective to retain the unit in its operated condition as long as said solenoid remains energized.

7. In a fluid operated brake system for vehicles, the combination with a fluid pressure responsive brake unit and means connected with said unit for supplying fluid pressure thereto, of a valve interposed between said unit and said means, said valve comprising a magnetizable shell, two magnetizable end members secured to the opposite ends of said shell, a valve stem slidably mounted in an axial hole in one of said end members and having an enlarged head disposed in a recess surrounding the outer end of said hole, a magnetizable plunger slidably mounted in an axial hole in the other end member and provided with an axial hole which receives said valve stem, means for adjustably securing said valve stem to said plunger, a winding in said shell surrounding said plunger, a valve casing secured to said one end member and provided with an annular valve seat directly opposite said enlarged head of said valve stem, and a rubber diaphragm clamped between said valve casing and said one end member and cooperating with said valve stem to close said valve when said winding is energized, said diaphragm also serving as a means to prevent the escape of fluid from said valve casing at its region of attachment to said one end member.

8. In a fluid operated brake system for vehicles, the combination with a fluid pressure responsive brake unit and means connected with said unit for supplying fluid pressure thereto, of a valve interposed between said unit and said means for controlling the flow of fluid away from said unit, said valve comprising a solenoid provided with a plunger actuating a valve stem, a casing secured to one end of said solenoid and provided with an annular valve seat in alignment with said valve stem, and a diaphragm clamped between said casing and said solenoid and arranged to be moved into engagement with said seat by said stem to close said valve when said solenoid is energized, said diaphragm being of a material which is sufficiently yieldable to permit the necessary movement thereof and to provide an efficient seal when pressed against said seat.

9. In a fluid operated brake system for vehicles, the combination with a fluid pressure responsive brake unit and means connected with said unit for supplying fluid pressure thereto, of a valve interposed between said unit and said means for controlling the flow of fluid away from said unit, said valve comprising a solenoid provided with a plunger actuating a valve stem, a casing secured to one end of said solenoid and provided with an annular valve seat in alignment with said valve stem, a diaphragm clamped between said casing and said solenoid and arranged to be moved into engagement with said seat by said stem to close said valve when said solenoid is energized, said diaphragm being of a material which is sufficiently yieldable to permit the necessary movement thereof and to provide an efficient seal when pressed against said seat, and means for adjusting the position of said valve stem relative to said plunger to enable the pressure with which said stem forces said diaphragm into engagement with said seat to be varied.

10. In a fluid operated brake system for vehicles, the combination with a fluid pressure responsive brake unit and means associated with said unit for supplying fluid pressure thereto, of a valve interposed between said unit and said means for controlling the flow of fluid away from said unit, said valve comprising a solenoid provided with a plunger actuating a valve stem, a casing secured to one end of said solenoid and provided with an annular valve seat in alignment with said valve stem, and a diaphragm clamped between said casing and said solenoid and arranged to be moved into engagement with said seat by said stem to close said valve when said solenoid is energized, said diaphragm being of a material which is sufficiently yieldable to permit the necessary movement thereof to enable said valve to be effectively closed and to insure an efficient seal between said casing and said solenoid.

11. In a fluid operated brake system for vehicles, the combination with a fluid responsive brake applying means and a conduit through which fluid is at times supplied to said means to cause a brake application, of a valve in said conduit for controlling the flow of fluid through said conduit, said valve comprising two relatively movable valve parts one of which is sufficiently flexible when held in engagement with the other part to provide a seal which is effective to prevent the flow of fluid through said conduit in the direction to release the brakes, and solenoid operated means for at times holding said valve parts in engagement with each other to prevent the release of the brakes following a brake application.

GEORGE J. LANZ.